US012681603B2

(12) United States Patent
Kim et al.

(10) Patent No.: US 12,681,603 B2
(45) Date of Patent: Jul. 14, 2026

(54) DISPLAY APPARATUS AND ELECTRONIC APPARATUS INCLUDING THE SAME

(71) Applicant: Samsung Display Co., LTD., Yongin-si (KR)

(72) Inventors: Hyungbae Kim, Yongin-si (KR); Sanghyun Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/961,276

(22) Filed: Nov. 26, 2024

(65) Prior Publication Data

US 2025/0264961 A1 Aug. 21, 2025

(30) Foreign Application Priority Data

Feb. 21, 2024 (KR) ........................ 10-2024-0025305

(51) Int. Cl.
| | |
|---|---|
| *G06F 3/041* | (2006.01) |
| *G06F 3/044* | (2006.01) |
| *G09G 3/20* | (2006.01) |
| *G09G 3/3225* | (2016.01) |

(52) U.S. Cl.
CPC .......... *G06F 3/0418* (2013.01); *G06F 3/0412* (2013.01); *G09G 3/2096* (2013.01); *G09G 3/3225* (2013.01); *G06F 3/04164* (2019.05); *G06F 3/0445* (2019.05);
(Continued)

(58) Field of Classification Search
CPC ......... G06F 2203/04111; G06F 3/0412; G06F 3/04164; G06F 3/0418; G06F 3/0445; G06F 3/0446; G06F 3/04184; G06F 3/0416; G06F 2203/04101; G09G 2354/00; G09G 3/2096; G09G 3/3225; G09G 3/035; G09G 3/3208; G09G 2310/0243; G09G 2310/0264; G09G 2370/00; G09G 2370/02; G09G 2380/02; G09F 9/335; H10K 59/131; H10K 59/40
See application file for complete search history.

(56) References Cited

U.S. PATENT DOCUMENTS

| | | | |
|---|---|---|---|
| 10,969,911 B2 | 4/2021 | Kim et al. | |
| 2017/0315652 A1 * | 11/2017 | Pourbigharaz | ........ G06F 3/0416 |
| 2018/0145822 A1 | 5/2018 | Takahashi et al. | |

(Continued)

FOREIGN PATENT DOCUMENTS

| | | |
|---|---|---|
| KR | 10-2016-0045860 A | 4/2016 |
| KR | 10-2018-0018523 A | 2/2018 |
| KR | 10-2018-0133850 A | 12/2018 |

*Primary Examiner* — Hong Zhou
(74) *Attorney, Agent, or Firm* — Womble Bond Dickinson (US) LLP

(57) ABSTRACT

A display apparatus includes: a display panel including a display layer and a touch screen layer; a flexible printed circuit board electrically connected to one side of the display panel; a driving driver on the display panel; a processor on the flexible printed circuit board; and mobile industry processor interface (MIPI) data lanes on the flexible printed circuit board and electrically connecting the processor and the driving driver to each other, wherein each of the MIPI data lanes includes a first access line and a second access line, and in at least one of the MIPI data lanes, a phase of a signal at the first access line and a phase of a signal at the second access line are configured to be different from each other, based on transmission of a low power state (LPS) signal.

25 Claims, 11 Drawing Sheets

(52) U.S. Cl.
    CPC .. *G06F 3/0446* (2019.05); *G06F 2203/04111*
                    (2013.01); *G09G 2354/00* (2013.01)

(56)                    References Cited

U.S. PATENT DOCUMENTS

| 2019/0130845 | A1* | 5/2019 | Han | G09G 3/3266 |
| 2020/0304281 | A1 | 9/2020 | Takahashi | |
| 2022/0245084 | A1* | 8/2022 | Kim | G06F 1/3278 |
| 2022/0374127 | A1* | 11/2022 | Kwon | G06F 3/147 |
| 2024/0339062 | A1* | 10/2024 | Jia | G09G 3/20 |
| 2025/0220300 | A1* | 7/2025 | Tong | H04N 23/71 |

* cited by examiner

DISPLAY APPARATUS AND ELECTRONIC APPARATUS INCLUDING THE SAME

CROSS-REFERENCE TO RELATED APPLICATIONS

The present application claims priority to and the benefit of Korean Patent Application No. 10-2024-0025305, filed on Feb. 21, 2024, in the Korean Intellectual Property Office, the entire disclosure of which is incorporated herein by reference.

BACKGROUND

1. Field

Aspects of one or more embodiments relate to a display apparatus and an electronic apparatus including the same.

2. Description of the Related Art

In general, a display apparatus includes a touch screen layer and when a finger of a user or a stylus pen touches the display apparatus or approaches the display apparatus, the presence and location of such a touch or approach may be detected.

For the touch screen layer to accurately detect the presence and location of the touch or approach, it may be desirable to reduce generation of noise in the touch screen layer.

The above information disclosed in this Background section is only for enhancement of understanding of the background and therefore the information discussed in this Background section does not necessarily constitute prior art.

SUMMARY

Aspects of one or more embodiments relate to a display apparatus and an electronic apparatus including the same, and for example, to a display apparatus and an electronic apparatus in which error occurrence in a touch screen layer may be relatively reduced.

In some display apparatuses there may be noise in a touch screen layer or a signal line electrically connected to the touch screen layer, and thus, an error may occur in the touch screen layer.

Aspects of one or more embodiments may include a display apparatus in which error occurrence in a touch screen layer is relatively reduced.

Additional aspects will be set forth in part in the description which follows and, in part, will be apparent from the description, or may be learned by practice of the presented embodiments of the disclosure.

According to some embodiments, a display apparatus includes a display panel including a display layer and a touch screen layer, a flexible printed circuit board electrically connected to one side of the display panel, a driving driver on the display panel, a processor on the flexible printed circuit board, and mobile industry processor interface (MIPI) data lanes on the flexible printed circuit board and electrically connecting the processor and the driving driver to each other, wherein each of the MIPI data lanes includes a first access line and a second access line, and in at least one of the MIPI data lanes, a phase of a signal at the first access line and a phase of a signal at the second access line are different from each other, when transmitting a low power state (LPS) signal.

According to some embodiments, when the at least one of the MIPI data lanes transmits the LPS signal, the phase of the signal at the second access line may be opposite to the phase of the signal at the first access line.

According to some embodiments, when the at least one of the MIPI data lanes transmits the LPS signal, the signal at the second access line may be an inverted signal of the signal at the first access line.

According to some embodiments, the display apparatus may further include a touch driver on the flexible printed circuit board, and touch signal lines on the flexible printed circuit board such that the touch signal lines are on a layer different from a layer on which the MIPI data lanes are located, intersect the MIPI data lanes, and electrically connect the touch driver and the touch screen layer to each other.

According to some embodiments, the display apparatus may further include a touch communication line on the flexible printed circuit board and electrically connecting the processor and the touch driver to each other.

According to some embodiments, in each of the MIPI data lanes, the phase of the signal at the first access line and the phase of the signal at the second access line may be different from each other, when transmitting the LPS signal.

According to some embodiments, in each of the MIPI data lanes, the phase of the signal at the first access line may be opposite to the phase of the signal at the second access line, when transmitting the LPS signal.

According to some embodiments, in each of the MIPI data lanes, the signal at the first access line may be an inverted signal of the signal at the second access line, when transmitting the LPS signal.

According to one or more embodiments, a display apparatus includes a display panel including a display layer and a touch screen layer, a flexible printed circuit board electrically connected to one side of the display panel, a driving driver on the display panel, a processor on the flexible printed circuit board, and mobile industry processor interface (MIPI) data lanes on the flexible printed circuit board and electrically connecting the processor and the driving driver to each other, wherein, in two adjacent lanes of the MIPI data lanes, a phase of a signal at one lane and a phase of a signal at the other lane are different from each other, when transmitting a low power state (LPS) signal.

According to some embodiments, the phase of the signal at the one lane may be opposite to the phase of the signal at the other lane when transmitting the LPS signal.

According to some embodiments, the signal at the one lane may be an inverted signal of the signal at the other lane when transmitting the LPS signal.

According to some embodiments, the display apparatus may further include a touch driver on the flexible printed circuit board, and touch signal lines on the flexible printed circuit board such that the touch signal lines are on a layer different from a layer on which the MIPI data lanes are located, intersect the MIPI data lanes, and electrically connect the touch driver and the touch screen layer to each other.

According to some embodiments, the display apparatus may further include a touch communication line on the flexible printed circuit board and electrically connecting the processor and the touch driver to each other.

According to some embodiments, a number of the MIPI data lanes may be an even number, and a phase of a signal at odd-numbered MIPI data lanes may be different from a phase of a signal at even-numbered MIPI data lanes when transmitting the LPS signal.

According to some embodiments, a number of the MIPI data lanes may be an even number, and a phase of a signal at odd-numbered MIPI data lanes may be opposite to a phase of a signal at even-numbered MIPI data lanes when transmitting the LPS signal.

According to some embodiments, a number of the MIPI data lanes may be an even number, and a signal at odd-numbered MIPI data lanes may be an inverted signal of a signal at even-numbered MIPI data lanes when transmitting the LPS signal.

According to some embodiments, each of the MIPI data lanes may include a first access line and a second access line, and in each of the MIPI data lanes, a phase of a signal at the first access line and a phase of a signal at the second access line may be the same.

According to one or more embodiments, a display apparatus includes a display panel including a display layer and a touch screen layer, a flexible printed circuit board electrically connected to one side of the display panel, a driving driver on the display panel, a processor on the flexible printed circuit board, and mobile industry processor interface (MIPI) data lanes on the flexible printed circuit board and electrically connecting the processor and the driving driver to each other, wherein each of the MIPI data lanes includes a first access line and a second access line, and a number of the MIPI data lanes is an odd number of three or greater, in a pair of two adjacent lanes of the MIPI data lanes, a phase of a signal at one lane of the pair and a phase of a signal at the other lane of the pair are different from each other, when transmitting a low power state (LPS) signal, and in remaining unpaired lanes of the MIPI data lanes, a phase of a signal at the first access line and a phase of a signal at the second access line are different from each other, when transmitting the LPS signal.

According to some embodiments, the signal at the one lane of the pair may be an inverted signal of the signal at the other lane of the pair.

According to some embodiments, a signal at the first access line of the remaining unpaired lanes may be an inverted signal of a signal at the second access line of the remaining unpaired lanes.

According to one or more embodiments, an electronic apparatus includes one of the display apparatuses described above.

According to some embodiments, the electronic apparatus is at least one of a smartphone, a mobile phone, a navigation device, a television (TV), a dashboard of a vehicle, a center information display (CID) apparatus of a vehicle, a room mirror display of a vehicle, a backseat entertainment device of a vehicle, an electronic notebook, an electronic book, an ultra mobile PC, a laptop computer, a tablet computer, a portable media player (PMP), a smart watch, a watch phone, a glasses type display, or a head-mounted display (HDM).

Other aspects, features, and characteristics other than those described above will become apparent from the detailed descriptions, claims and drawings for carrying out the following disclosure.

BRIEF DESCRIPTION OF THE DRAWINGS

The above and other aspects, features, and characteristics of certain embodiments of the disclosure will be more apparent from the following description taken in conjunction with the accompanying drawings, in which.

DETAILED DESCRIPTION

Figure 1:
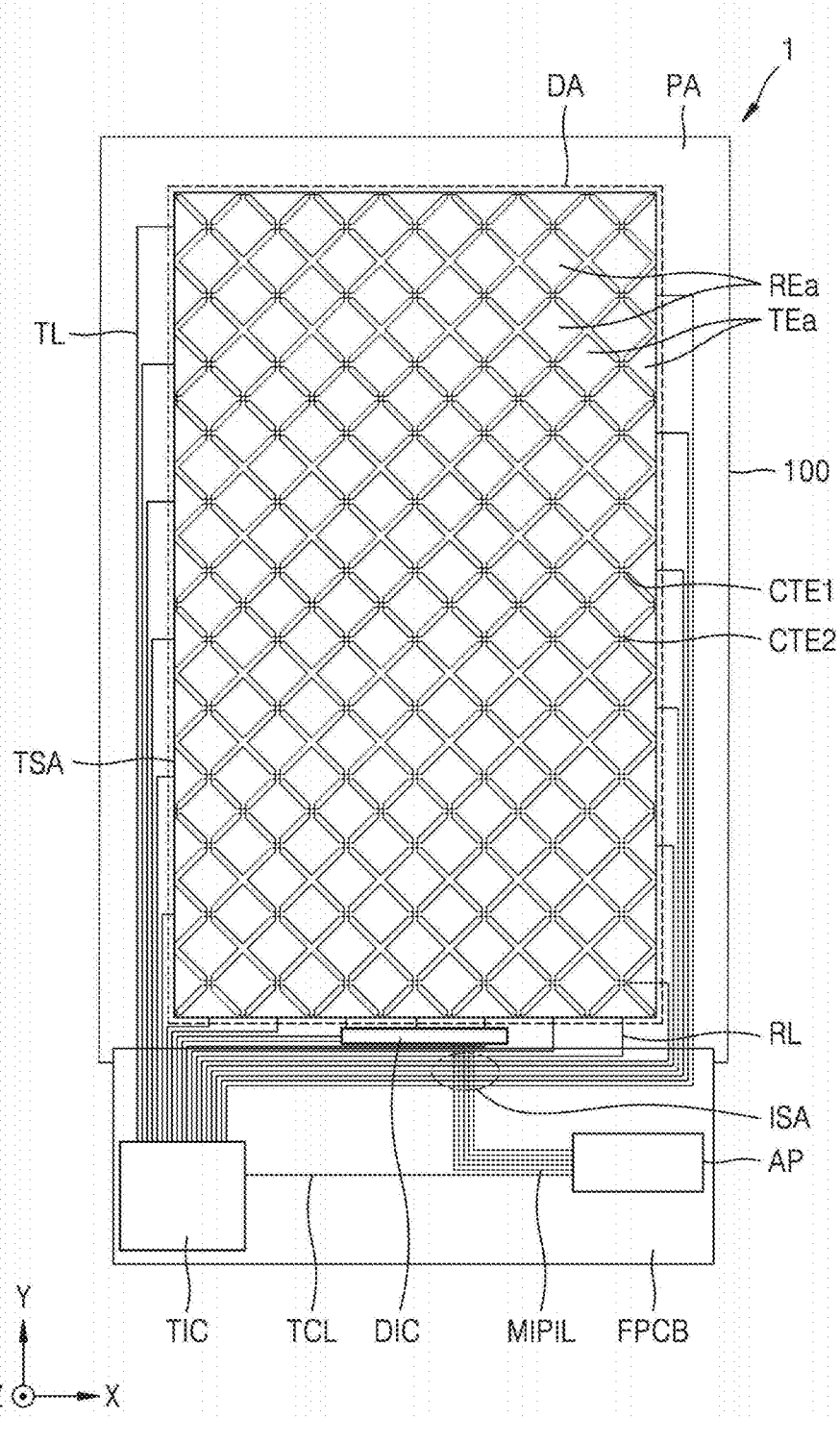
FIG. 1 is a plan view schematically showing a portion of a display apparatus, according to some embodiments.

The disclosure may have various modifications and various embodiments, and specific embodiments are illustrated in the drawings and are described in more detail in the detailed description. Effects and features of the disclosure and methods of achieving the same will become apparent with reference to embodiments described in more detail with reference to the drawings. However, embodiments according to the present disclosure are not limited to the embodiments described below, and may be implemented in various forms.

Hereinafter, aspects of some embodiments will be described in more detail with reference to the accompanying drawings, and in the following description with reference to the drawings, like reference numerals refer to like components and redundant descriptions thereof will be omitted.

It will be understood that when a layer, region, or component is referred to as being "formed on," another layer, region, or component, it can be directly or indirectly formed on the other layer, region, or component. That is, for example, intervening layers, regions, or components may be present. Sizes of elements in the drawings may be exaggerated for convenience of explanation. In other words, because sizes and thicknesses of components in the drawings are arbitrarily illustrated for convenience of explanation, the disclosure is not necessarily limited thereto.

According to embodiments, an x-axis, a y-axis, and a z-axis are not limited to three axes on an orthogonal coordinate system, but may be interpreted in a broad sense including the three axes. For example, the x-axis, the y-axis, and the z-axis may be perpendicular to one another, or may represent different directions that are not perpendicular to one another.

In the following embodiments, the terms "first" and "second" are not used in a limited sense and are used to distinguish one component from another component.

It will be further understood that the terms "comprise" or "comprising" used herein specify the presence of stated features or elements, but do not preclude the presence or addition of one or more other features or elements.

In the specification, "A and/or B" denotes only A, only B, or both A and B. Also, "at least one of A or B" denotes only A, only B, or both A and B.

When a layer, region, component, or the like is connected to another layer, region, component, or the like, the layer, the region, the component, or the like may be not only directly connected thereto, but also indirectly connected thereto with an intervening layer, region, component, or the like therebetween. For example, in the specification, when a layer, region, component, or the like is electrically connected to another layer, region, component, or the like, the layer, region, component, or the like may be not only directly electrically connected thereto, but also indirectly electrically connected thereto with an intervening layer, region, component, or the like therebetween.

FIG. 1 is a plan view schematically showing a portion of a display apparatus 1, according to some embodiments.

The display apparatus 1 may include a display panel including a display layer and a touch screen layer, and a flexible printed circuit board FPCB. The display panel may include a display area DA and a peripheral area PA (e.g., in a periphery or outside a footprint of the display area DA). It may be understood that a substrate 100 included in the display panel includes the display area DA and the peripheral area PA. The display layer includes a display device such as an organic light-emitting diode OLED, and such a display device may be located in the display area DA of the display panel. The display panel may include a driving driver DIC located in the peripheral area PA, and the driving driver DIC may drive a pixel circuit or the like electrically connected to the display device in the display area DA. In addition, the display apparatus 1 may include a touch driver TIC located on the flexible printed circuit board FPCB and driving the touch screen layer, and a processor AP located on the flexible printed circuit board FPCB and controlling the driving driver DIC and the touch driver TIC.

For reference, the display apparatus 1 according to some embodiments may be not only a portable electronic apparatus, such as a mobile phone, a smartphone, a tablet personal computer (PC), an electronic notebook, an electronic book, a portable multimedia player (PMP), a navigation device, or an ultra mobile PC (UMPC), but also any electronic apparatus, such as a television, a laptop computer, a monitor, a bulletin board, or the Internet of things (IoT). Alternatively, the display apparatus 1 according to some embodiments may be an electronic apparatus such as a wearable device, such as a smart watch, a watch phone, a glasses type display, or a head-mounted display (HMD). Alternatively, the display apparatus 1 according to some embodiments may be an electronic apparatus such as a dashboard of a vehicle, a center information display (CID) apparatus arranged on a center fascia or dashboard of a vehicle, a room mirror display apparatus replacing a side mirror of a vehicle, or a backseat entertainment device of a vehicle. In one or more embodiments, an electronic apparatus may include the display apparatus 1.

The driving driver DIC described above may be an integrated circuit chip and may be directly mounted on the substrate 100 of the display panel in a chip-on-glass (COG) or chip-on-plastic (COP) manner. In this regard, the display panel includes the driving driver DIC in FIG. 1, but embodiments according to the present disclosure are not limited thereto. For example, the driving driver DIC may be mounted on the flexible printed circuit board FPCB. The driving driver DIC may make the display area DA display an image by transmitting a data signal or the like to pixels of the display panel, based on image data and/or a control signal received from the processor AP through mobile industry processor interface (MIPI) lanes MIPIL. According to some embodiments, the driving driver DIC may transmit the control signal to a gate driver arranged in the peripheral area PA of the display panel so that a scan signal or the like is applied to the display area DA.

The flexible printed circuit board FPCB may be electrically connected to pads located at an edge of the display panel (in a −Y direction). The touch driver TIC and the processor AP may be mounted on the flexible printed circuit board FPCB as described above. According to some embodiments, the driving driver DIC may also be mounted on the flexible printed circuit board FPCB.

The touch driver TIC may be an integrated circuit chip. The touch driver TIC drives the touch screen layer included in the display panel, and when a finger of a user or a stylus pen touches the display apparatus 1 or approaches the display apparatus 1, may detect presence and location of such a touch or approach.

The processor AP may be a graphics processing unit (GPU). Alternatively, the processor AP may be an application processor including the GPU. In the display apparatus 1 according to some embodiments, the processor AP may denote the application processor including the GPU. The processor AP may transmit input image data and a control signal to the driving driver DIC through the MIPI lanes MIPIL extending from the processor AP on the flexible printed circuit board FPCB to the driving driver DIC of the display panel. Also, the processor AP may transmit a control signal for controlling the touch driver TIC to the touch driver TIC through a touch communication line TCL extending on the flexible printed circuit board FPCB from the processor AP to the touch driver TIC.

The touch screen layer may include areas corresponding to the display area DA and the peripheral area PA of the display panel.

The touch screen layer may be a capacitance type touch screen layer configured to sense a capacitance change according to a contact of a conductive object, such as a finger or a stylus pen. The touch screen layer may be an add-on type touch screen panel attached on the display panel. Alternatively, the touch screen layer may be an embedded type touch screen layer formed in the display panel. For example, the touch screen layer may be an on-cell type embedded type touch screen layer or an in-cell type embedded type touch screen layer. However, embodiments according to the present disclosure are not limited thereto.

The touch screen layer may include a touch sense area TSA corresponding to the display area DA of the display panel. According to some embodiments, the touch screen layer may be arranged only in a limited area required for touch recognition, and in this case, the touch screen layer may overlap only a portion of the display area DA. A plurality of driving electrodes TEa and a plurality of sensing electrodes REa may be arranged in the touch sense area TSA.

The plurality of driving electrodes TEa may be spaced apart from each other along a first direction (X-axis direction) and a second direction (Y-axis direction). Here, the driving electrodes TEa neighboring in the first direction may be connected to each other by first connecting electrodes CTE1, and as a result, driving lines extending in the first direction (X-axis direction) may be arranged along the second direction (Y-axis direction) approximately parallel to each other. The driving lines may be electrically connected to the touch driver TIC through respective driving signal lines TL.

The plurality of sensing electrodes REa may also be spaced apart from each other in the first direction (X-axis direction) and the second direction (Y-axis direction). Here, the sensing electrodes REa neighboring in the second direction may be connected to each other by second connecting electrodes CTE2, and as a result, sensing lines extending in the second direction (Y-axis direction) may be arranged along the first direction (X-axis direction) approximately parallel to each other. The sensing lines may be electrically connected to the touch driver TIC through respective sensing signal lines RL.

According to some embodiments, the first connecting electrodes CTE1 and the second connecting electrodes CTE2 may be electrically insulated from each other. Accordingly, the driving lines and the sensing lines may cross each other in a plan view (i.e., on an XY plane).

The touch driver TIC may apply a driving signal to the driving electrodes TEa through the driving signal lines TL to drive the touch screen layer. Also, the touch driver TIC may receive a sensing signal from the sensing electrodes REa through the sensing signal lines RL. The driving signal lines TL and the sensing signal lines RL extend from the flexible printed circuit board FPCB where the touch driver TIC is located to the driving electrodes TEa and the sensing electrodes REa of the display panel. When there is a touch of the conductive object on the touch screen layer, capacitance between the driving electrode TEa and the sensing electrode REa may change. The touch driver TIC may sense such a change in the capacitance through the sensing signal lines RL to recognize the touch and touch information, such as a touch location.

In this regard, the touch driver TIC may include a signal driver, a signal sensor, a memory, and a touch controller. The signal driver may receive, from the touch controller, a control signal according to a driving frequency of the touch screen layer, and in response to the control signal, apply the driving signal to the plurality of driving electrodes TEa through the driving signal lines TL according to the driving frequency of the touch screen layer. The signal sensor may receive a sensing signal from the plurality of sensing electrodes REa and convert the same into a digital signal. The signal sensor may include an analog frontend configured to receive an analog signal, and an analog-to-digital converter configured to convert the received analog signal into a digital signal. The memory may store software and/or an algorithm for the touch driver TIC to operate. The memory may include random access memory (RAM) and/or a flash memory. The touch controller may control operations of the touch driver TIC. The touch controller may transmit, to the signal driver, the control signal according to the driving frequency of the touch screen layer. The touch controller may determine a touch input and a touch location, based on the sensing signals received from the sensing electrodes REa on the touch screen layer. The touch controller may include a micro-controller unit (MCU) and/or a central processing unit (CPU).

According to some embodiments, the touch driver TIC may be a single chip including the touch controller described above, or the touch driver TIC may be a chip including the signal driver, the signal sensor, and the memory, and the touch controller may be a separate chip different from the touch driver TIC.

Figure 2:
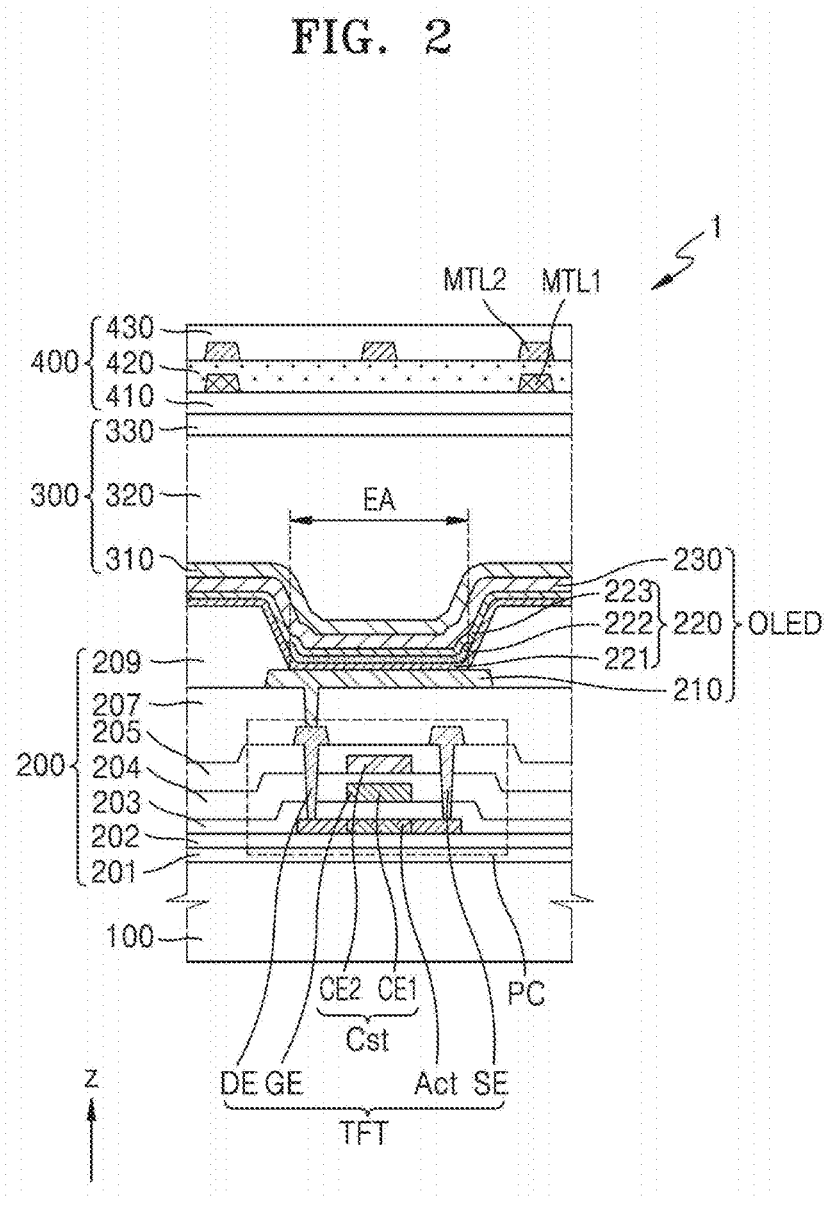
FIG. 2 is a cross-sectional view schematically showing a portion of FIG. 1.

FIG. 2 is a cross-sectional view of a portion of the display panel included in the display apparatus 1 of FIG. 1, and is a cross-sectional view schematically showing a portion of the display area DA. As shown in FIG. 2, a lower component layer 200, the organic light-emitting diode OLED that is the display device, an encapsulation layer 300, and a touch screen layer 400 may be located on the substrate 100. The lower component layer 200 may include a pixel circuit PC electrically connected to the organic light-emitting diode OLED.

The substrate 100 may include glass, a metal, or a polymer resin. When the substrate 100 is flexible or bendable, the substrate 100 may include a polymer resin, for example, polyethersulfone, polyarylate, polyetherimide, polyethylene naphthalate, polyethylene terephthalate, polyphenylene sulfide, polyarylate, polyimide, polycarbonate, or cellulose acetate propionate.

A buffer layer 202 may be located on the substrate 100. The buffer layer 202 may planarize a top surface of the substrate 100. A barrier layer 201 for blocking impurities, such as oxygen or moisture, penetrating from the outside through the substrate 100 may be provided between the substrate 100 and the buffer layer 202. The barrier layer 201 and the buffer layer 202 may include an inorganic insulating material, such as silicon oxide, silicon nitride, silicon oxynitride, aluminum oxide, aluminum nitride, titanium oxide, titanium nitride, tantalum oxide, hafnium oxide, or zirconium oxide, or an organic insulating material, such as polyimide, polyester, or acryl. According to some embodiments, the barrier layer 201 and the buffer layer 202 may be integrated with each other.

The pixel circuit PC including a thin-film transistor TFT and a storage capacitor Cst may be located on the buffer layer 202. In FIG. 2, only one thin-film transistor TFT is illustrated, but this is only for convenience, and the pixel circuit PC may include a plurality of thin-film transistors TFT.

The thin-film transistor TFT may include a semiconductor layer Act, a gate electrode GE, a drain electrode DE, and a source electrode SE. The semiconductor layer Act may be located on the buffer layer 202 and may include a semiconductor material, for example, amorphous silicon or polycrystalline silicon. However, embodiments according to the present disclosure are not limited thereto and the semiconductor layer Act may contain various materials. For example, the semiconductor layer Act may include an organic semiconductor material or an oxide semiconductor material. Examples of the oxide semiconductor material include oxides of materials selected from 12, 13, or 14-group metal elements, such as zinc (Zn), indium (In), gallium (Ga), tin (Sn), cadmium (Cd), and germanium (Ge), or a combination thereof.

A first gate insulating layer 203 may cover the semiconductor layer Act. The first gate insulating layer 203 may include an inorganic insulating material, such as silicon oxide, silicon nitride, silicon oxynitride, aluminum oxide, aluminum nitride, titanium oxide, titanium nitride, tantalum oxide, hafnium oxide, or zirconium oxide. The first gate insulating layer 203 may have a single-layer structure or a multi-layer structure. The first gate insulating layer 203 insulates the semiconductor layer Act from the gate electrode GE.

The gate electrode GE may be located on the first gate insulating layer 203. When necessary, the gate electrode GE may be electrically connected to a gate line applying an on/off signal to the thin-film transistor TFT. For example, the gate electrode GE may be a portion of the gate line, i.e., a portion of the gate line overlapping the semiconductor layer Act when viewed in a direction perpendicular to a z-axis (i.e., on a plan view).

The gate electrode GE may include a metal material. The gate electrode GE may include, for example, aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), molybdenum (Mo), titanium (Ti), tungsten (W), or copper (Cu), considering adhesiveness to an adjacent layer, surface flatness of a layer being stacked, and processability. According to some embodiments, the gate electrode GE may have a single-layer structure or a multi-layer structure. For example, the gate electrode GE may have a three-layer structure of a molybdenum layer/aluminum layer/molybdenum layer.

A second gate insulating layer 204 may cover the gate electrode GE. The second gate insulating layer 204 may include an inorganic insulating material, such as silicon oxide, silicon nitride, silicon oxynitride, aluminum oxide, aluminum nitride, titanium oxide, titanium nitride, tantalum oxide, hafnium oxide, or zirconium oxide. The second gate insulating layer 204 may have a single-layer structure or a multi-layer structure.

A second electrode CE2 of the storage capacitor Cst may be located on the second gate insulating layer 204. The second electrode CE2 may overlap the gate electrode GE. The gate electrode GE and the second electrode CE2 may overlap each other with the second gate insulating layer 204 therebetween, thereby forming the storage capacitor Cst. In other words, the gate electrode GE may operate as a first electrode CE1 of the storage capacitor Cst.

The second electrode CE2 may include aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), molybdenum (Mo), titanium (Ti), tungsten (W), or copper (Cu). According to some embodiments, the second electrode CE2 may have a single-layer structure or a multi-layer structure. For example, the second electrode CE2 may have a three-layer structure of a molybdenum layer/aluminum layer/molybdenum layer.

An interlayer insulating layer 205 may cover the second electrode CE2. Also, the source electrode SE and/or the drain electrode DE may be located on the interlayer insulating layer 205. In other words, the interlayer insulating layer 205 may electrically insulate the source electrode SE and the drain electrode DE from the second electrode CE2 or the like. The interlayer insulating layer 205 may include an inorganic insulating material, such as silicon oxide, silicon nitride, silicon oxynitride, aluminum oxide, aluminum nitride, titanium oxide, titanium nitride, tantalum oxide, hafnium oxide, or zirconium oxide. The interlayer insulating layer 205 may have a single-layer structure or a multi-layer structure.

The source electrode SE and/or the drain electrode DE may be located on the interlayer insulating layer 205. The source electrode SE and/or the drain electrode DE may include aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), molybdenum (Mo), titanium (Ti), tungsten (W), or copper (Cu). According to some embodiments, the source electrode SE and/or the drain electrode DE may have a single-layer structure or a multi-layer structure. For example, the source electrode SE and/or drain electrode DE may have a three-layer structure, such as titanium layer/aluminum layer/titanium layer.

In FIG. 2, the thin-film transistor TFT includes both the source electrode SE and the drain electrode DE, but the disclosure is not limited thereto. For example, one pixel circuit for controlling operations of one organic light-emitting diode OLED may include a plurality of thin-film transistors. The semiconductor layer Act included in a first thin-film transistor that is one of the plurality of thin-film transistors may be integrated with the semiconductor layer Act included in a second thin-film transistor that is another one of the plurality of thin-film transistors, and in this case, the first thin-film transistor may not include a drain electrode and the second thin-film transistor may not include a source electrode. In other words, a drain region of the semiconductor layer Act included in the first thin-film transistor and a source region of the semiconductor layer Act included in the second thin-film transistor may be connected or integrated to each other.

Meanwhile, the source electrode SE and/or the drain electrode DE may be a portion of a signal line or a portion of a connecting electrode. For example, the source electrode SE and/or the drain electrode DE may be a portion of a data line or a portion of a connecting electrode located between the data line and the semiconductor layer Act to electrically connect the same. In this case, the source electrode SE and/or the drain electrode DE may be a portion of the signal line or the connecting electrode, i.e., a portion of the signal line or the connecting electrode, which overlaps the semiconductor layer Act, when viewed in the direction perpendicular to the z-axis (i.e., a plan view). The source electrode SE and/or the drain electrode DE may be in contact with the semiconductor layer Act through a contact hole formed in the interlayer insulating layer 205.

A planarization layer 207 may cover the thin-film transistor TFT. A top surface of the planarization layer 207 may be approximately flat despite the presence of the thin-film transistor TFT therebelow. In this regard, the planarization layer 207 may include an organic insulating material. For example, the planarization layer 207 may include photoresist, benzocyclobutene (BCB), polyimide, hexamethyldisiloxane (HMDSO), polymethylmethacrylate (PMMA), polystyrene, a polymer derivative having a phenol-based group, acryl-based polymer, imide-based polymer, arylether-based polymer, amide-based polymer, fluorine-based polymer, p-xylene-based polymer, vinyl alcohol-based polymer, or a mixture thereof.

According to some embodiments, at least one other insulating layer including an inorganic insulating material may be arranged between the thin-film transistor TFT and the planarization layer 207. Also, a connecting electrode or a signal line may be provided between such an insulating layer and the planarization layer 207. When insulating layers including an inorganic insulating material is arranged between the thin-film transistor TFT and the planarization layer 207, a connecting electrode or a signal line may also be arranged between the insulating layers.

The organic light-emitting diode OLED may be located on the planarization layer 207. The organic light-emitting diode OLED may include a pixel electrode 210, an intermediate layer 220 including an emission layer, and an opposing electrode 230.

The pixel electrode 210 may be a (semi-) transmissive electrode or a reflective electrode. For example, the pixel electrode 210 may include a reflective layer including Ag, Mg, Al, Pt, Pd, Au, Ni, Nd, Ir, Cr, or a compound thereof, and a transparent conductive layer on the reflective layer. The transparent conductive layer may include at least one of indium tin oxide (ITO), indium zinc oxide (IZO), zinc oxide (ZnO$_2$), indium oxide (In$_2$O$_3$), indium gallium oxide (IGO), or aluminum zinc oxide (AZO). For example, the pixel electrode 210 may have a three-layer structure of ITO/Ag/ITO.

A pixel-defining layer 209 may be located on the planarization layer 207. The pixel-defining layer 209 may include an opening exposing a center portion of the pixel electrode 210. The pixel-defining layer 209 may increase a distance between an edge of the pixel electrode 210 and the opposing electrode 230 on the pixel electrode 210, thereby preventing or reducing occurrences of an arc at the edge of the pixel electrode 210.

The pixel-defining layer 209 may include at least one organic insulating material from among polyimide, polyamide, acryl resin, benzocyclobutene, and phenol resin, and may be formed through spin coating or the like.

The intermediate layer 220 may be arranged between the pixel electrode 210 and the opposing electrode 230. The intermediate layer 220 may include a first functional layer 221, an emission layer 222, and a second functional layer 223.

The emission layer 222 may correspond to the pixel electrode 210. The emission layer 222 may include a high-molecular weight or a low-molecular weight material, and emit red, green, blue, or white light. The first functional layer 221 may be arranged between the pixel electrode 210 and the emission layer 222, and the second functional layer 223 may be arranged between the emission layer 222 and the opposing electrode 230. The first functional layer 221 and the second functional layer 223 may be integrated to correspond to the plurality of pixel electrodes 210. The first functional layer 221 may be a single layer or multilayer. For example, when the first functional layer 221 is formed of a high-molecular weight material, the first functional layer 221 may be a hole transport layer. When the first functional layer 221 is formed of a low-molecular weight material, the first functional layer 221 may include a hole injection layer and the hole transport layer. The second functional layer 223 may be a single layer or multilayer. The second functional layer 223 may include an electron transport layer and/or an electron injection layer.

The opposing electrode 230 may be a transmissive electrode or a reflective electrode. For example, the opposing electrode 230 may be a transparent or (semi-) transparent electrode, and include Li, Ca, LiF, Al, Ag, Mg, or a compound thereof. The opposing electrode 230 may further include a transparent conductive oxide (TCO) layer, such as ITO, IZO, ZnO, or In$_2$O$_3$, which is located on a metal thin film. The opposing electrode 230 may be integrated throughout the display area DA and located on the intermediate layer 220 and/or the pixel-defining layer 209. In other words, there may be one opposing electrode 230 for the plurality of organic light-emitting diodes OLED. In this regard, the opposing electrode 230 may be referred to as a common electrode.

The organic light-emitting diode OLED may be electrically connected to the thin-film transistor TFT. In FIG. 2, the pixel electrode 210 is in contact with the drain electrode DE of the thin-film transistor TFT, but embodiments according to the present disclosure are not limited thereto. For example, various modifications are possible, for example, the connecting electrode may be arranged between the pixel electrode 210 and the drain electrode DE of the thin-film transistor TFT.

The encapsulation layer 300 may be located on the organic light-emitting diode OLED. According to some embodiments, a capping layer may be arranged between the organic light-emitting diode OLED and the encapsulation layer 300 to increase extraction efficiency of light generated in the organic light-emitting diode OLED.

The encapsulation layer 300 may include at least one inorganic encapsulation layer and at least one organic encapsulation layer. In FIG. 2, the encapsulation layer 300 includes a first inorganic encapsulation layer 310 and a second inorganic encapsulation layer 330, and in addition, includes an organic encapsulation layer 320 arranged therebetween.

Each of the first inorganic encapsulation layer 310 and the second inorganic encapsulation layer 330 may include one or more inorganic insulating materials. The inorganic insulating material include aluminum oxide (Al$_2$O$_3$), titanium oxide (TiO$_2$), tantalum oxide (Ta$_2$O$_5$), hafnium oxide (HfO$_2$), zinc oxide (ZnO), silicon oxide (SiO$_x$), silicon nitride (SiN$_x$), and/or silicon oxynitride (SiON). The organic encapsulation layer 320 may further include polyethylene terephthalate, polyethylene naphthalate, polycarbonate, polyimide, polyethylene sulfonate, polyoxymethylene, polyarylate, HMDSO, acryl-based resin, or a combination thereof.

The encapsulation layer 300 includes the organic encapsulation layer 320 as such, and thus, a top surface of the encapsulation layer 300 may be approximately flat. Accordingly, the possibility of defects may be relatively reduced when forming components of the encapsulation layer 300 on the encapsulation layer 300.

The touch screen layer 400 may include a first touch insulating layer 410, a first touch conductive layer MTL1, a second touch insulating layer 420, a second touch conductive layer MTL2, and a third touch insulating layer 430.

The first touch insulating layer 410 may be located on the encapsulation layer 300. The first touch insulating layer 410 may include an inorganic insulating material, such as silicon oxide, silicon nitride, silicon oxynitride, aluminum oxide, aluminum nitride, titanium oxide, titanium nitride, tantalum oxide, hafnium oxide, or zirconium oxide, or an organic insulating material, such as polyimide, polyester, or acryl, and may have a single-layer structure or a multi-layer structure. Such a first touch insulating layer 410 may prevent or reduce damage to the encapsulation layer 300 and block an interference signal that may be generated when the touch screen layer 400 is driven.

Each of the first touch conductive layer MTL1 and the second touch conductive layer MTL2 may have a single-layer structure or a multi-layer structure. Each of the first touch conductive layer MTL1 and the second touch conductive layer MTL2 may include a metal layer or a transparent conductive layer. The metal layer may include Mo, Ag, Ti, Cu, Al, or an alloy thereof. The transparent conductive layer may include a transparent conductive oxide, such as ITO, IZO, ZnO, or ITZO. According to some embodiments, the transparent conductive layer may include a conductive polymer, such as poly(3,4-ethylenedioxythiophene) (PEDOT), metal nanowire, or graphene.

Each of the first touch conductive layer MTL1 and the second touch conductive layer MTL2 may include a plurality of patterns. The first touch conductive layer MTL1 may include first conductive patterns and the second touch conductive layer MTL2 may include second conductive patterns. The first touch conductive layer MTL1 and the second touch conductive layer MTL2 may be electrically connected to each other through a contact hole. The first touch conductive layer MTL1 and the second touch conductive layer MTL2 may have a mesh structure so that light emitted from the organic light-emitting diode OLED is transmitted. The first touch conductive layer MTL1 and the second touch conductive layer MTL2 may not overlap an emission area EA.

The second touch insulating layer 420 arranged between the first touch conductive layer MTL1 and the second touch conductive layer MTL2 may include an organic material or an inorganic material. For example, the second touch insulating layer 420 may include at least one material from among acryl-based resin, methacryl-based resin, polyisoprene, vinyl-based resin, epoxy-based resin, urethane-based resin, cellulose-based resin, and perylene-based resin. Alternatively, the second touch insulating layer 420 may include at least one material from among silicon nitride ($SiN_x$), aluminum nitride (AlN), zirconium nitride (ZrN), titanium nitride (TiN), hafnium nitride (HfN), tantalum nitride (TaN), silicon oxide ($SiO_x$), aluminum oxide ($Al_2O_3$), titanium oxide ($TiO_2$), tin oxide ($SnO_2$), cerium oxide ($CeO_2$), and silicon oxynitride (SiON).

The third touch insulating layer 430 may be located on the second touch conductive layer MTL2. The third touch insulating layer 430 may have a single-layer structure or a multi-layer structure. Like the second touch insulating layer 420 described above, the third touch insulating layer 430 may include an organic material or an inorganic material.

In FIG. 2, the touch screen layer 400 is directly formed on the encapsulation layer 300, but the disclosure is not limited thereto. For example, the touch screen layer 400 may be prepared as a functional module, for example, a touch screen panel, separate from the display panel, and attached to the display panel by using an optically clear adhesive.

As described above with reference to FIG. 1, the touch screen layer 400 may include the driving electrodes TEa, the driving signal lines TL electrically connected to the driving electrodes TEa, the sensing electrodes REa, the sensing signal lines RL electrically connected to the sensing electrodes REa, the first connecting electrodes CTE1, and the second connecting electrodes CTE2. The second touch conductive layer MTL2 of FIG. 2 may include the sensing electrodes REa, the driving electrodes TEa, and the first connecting electrodes CTE1 electrically connecting the driving electrodes TEa to each other. In other words, the driving electrodes TEa may be connected to each other by the first connecting electrodes CTE1 formed on a same layer. For example, the driving electrodes TEa and the first connecting electrodes CTE1 may be integrated with each other. The sensing electrodes REa located on a same layer as the driving electrodes TEa may be connected to each other by the second connecting electrodes CTE2 formed on another layer, through the contact hole. For example, the first touch conductive layer MTL1 of FIG. 2 may include the second connecting electrodes CTE2.

Embodiments according to the present disclosure are not limited thereto. For example, the first touch conductive layer MTL1 may include the driving electrodes TEa and the first connecting electrodes CTE1, and the second touch conductive layer MTL2 may include the sensing electrodes REa and the second connecting electrodes CTE2.

Figure 3:
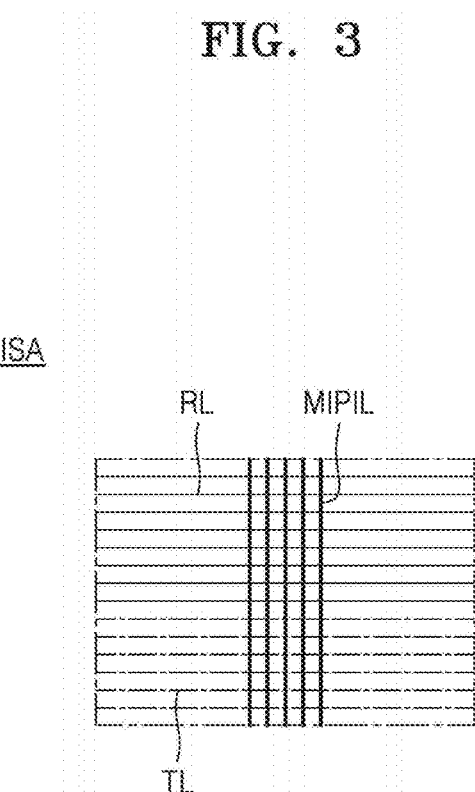
FIG. 3 is an enlarged conceptual view schematically showing a portion ISA of FIG. 1.

Meanwhile, as shown in FIG. 1 and FIG. 3 that is an enlarged conceptual view schematically showing a portion ISA of FIG. 1, the driving signal lines TL and the sensing signal lines RL may be located on a layer different from a layer on which the MIPI lanes MIPIL are located and intersect the MIPI lanes MIPIL, over the substrate 100 and/or the flexible printed circuit board FPCB. FIGS. 1 and 3 illustrate that the driving signal lines TL and the sensing signal lines RL are located on the layer different from the layer on which the MIPI lanes MIPIL are arranged and intersect the MIPI lanes MIPIL over the flexible printed circuit board FPCB.

Figure 4:
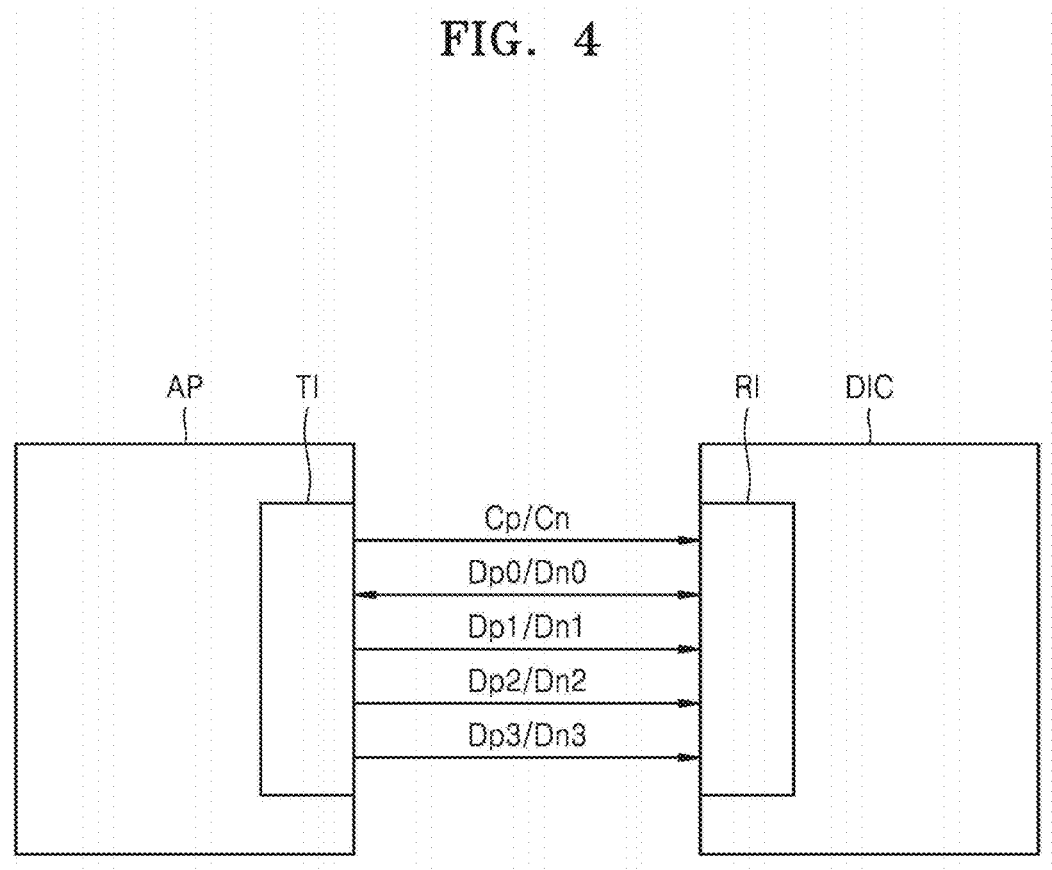
FIG. 4 is a conceptual view to describe a communication method between a driving driver and a processor shown in FIG. 1.

FIG. 4 is a conceptual view to describe a communication method between the driving driver DIC and the processor AP shown in FIG. 1.

The processor AP includes a transmitting interface TI and the driving driver DIC includes a receiving interface RI, and thus, the processor AP and the driving driver DIC may communicate through the transmitting interface TI and the receiving interface RI. Such an interface may be MIPI. In other words, the transmitting interface TI and the receiving interface RI may communicate through MIPI.

The transmitting interface TI and the receiving interface RI may include one clock lane and at least one data lane. In FIG. 4, the transmitting interface TI and the receiving interface RI include four data lanes.

Each lane includes two access lines and may communicate through the two access lines. For example, the clock lane may transmit clock signals Cp and Cn through the access lines. The access lines of the clock lane may perform unidirectional communication from the transmitting interface TI to the receiving interface RI. When the transmitting interface TI and the receiving interface RI include four data lanes, signals Dp0, Dn0, Dp1, Dn1, Dp2, Dn2, Dp3, and Dn3 may be transmitted through four pairs of access lines as shown in FIG. 4. One pair of access lines among the four pairs of access lines may transmit the signals Dp0 and Dn0 through bidirectional communication between the transmitting interface TI and the receiving interface RI, and the remaining three pairs of access lines may transmit the signals Dp1, Dn1, Dp2, Dn2, Dp3, and Dn3 through unidirectional communication from the transmitting interface TI to the receiving interface RI. The clock lane and data lanes included in the transmitting interface TI and the receiving interface RI may follow the MIPI standards.

Signals transmitted from the transmitting interface TI to the receiving interface RI may be data signals and/or a plurality of synchronization signals corresponding to an image to be realized on the display panel. The data signals may be transmitted through the data lanes and the synchronization signals may be transmitted through the clock lane.

Figure 5:
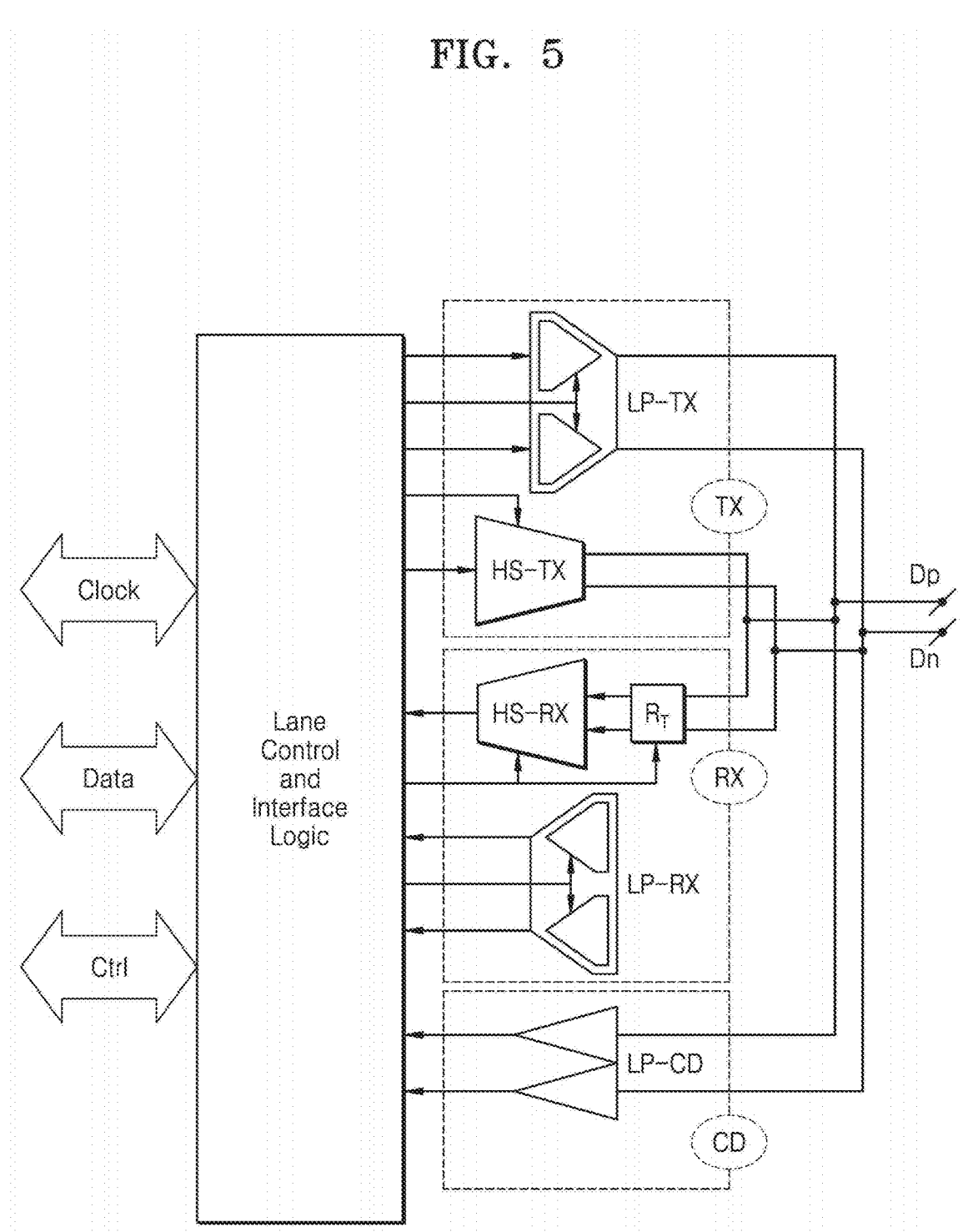
FIG. 5 is a conceptual diagram illustrating functions of a general-purpose data lane of a mobile industry processor interface (MIPI)

FIG. 5 is a conceptual diagram illustrating functions of a general-purpose data lane of MIPI. FIG. 5 illustrates a configuration of one lane including all general functions. As shown in FIG. 5, one lane may include a lane control and interface logic and input/output units TX, RX, and CD.

The input/output units TX, RX, and CD may include a high-speed transmitter HS-TX, a high-speed receiver HS-RX, a low-power transmitter LP-TX, a low-power receiver LP-RX, and a low-power contention detector LP-CD. A transmitter TX of the input/output units TX, RX, and CD may include the low-power transmitter LP-TX and the high-speed transmitter HS-TX. A receiver RX of the input/output units TX, RX, and CD may include the high-speed receiver HS-RX, the low-power receiver LP-RX, and a termination resistor RT (or termination impedance). A contention detector CD of the input/output units TX, RX, and CD may include the low-power contention detector LP-CD. The termination resistor RT may be enabled only when each lane is in a high speed receiving state.

High-speed signals may have a low voltage swing of, for example, 200 mV, whereas low-power signals may have a high voltage swing of, for example, 1.2 V.

The high-speed transmitter HS-TX and the high-speed receiver HS-RX may be mainly used for high-speed data transmission, and the low-power transmitter LP-TX, the low-power receiver LP-RX, and the low-power contention detector LP-CD may be mainly used for control, but the high-speed transmitter HS-TX, the high-speed receiver HS-RX, the low-power transmitter LP-TX, the low-power receiver LP-RX, and the low-power contention detector LP-CD may be selectively used for other cases. One lane may include one or both of the high-speed transmitter HS-TX and the high-speed receiver HS-RX. However, the high-speed transmitter HS-TX and the high-speed receiver HS-RX included in one lane may not be enabled simultaneously (or concurrently).

When a lane includes the high-speed transmitter HS-TX, the low-power transmitter LP-TX may also be included. Similarly, when a lane includes the high-speed receiver HS-RX, the low-power receiver LP-RX may also be included. The low-power contention detector LP-CD may be required only for a bidirectional operation. The low-power contention detector LP-CD may be enabled to detect a collision only when the low-power transmitter LP-TX drives low power states.

Such input/output functions are controlled by the lane control and interface logic. The lane control and interface logic may perform an interface with a protocol layer and determine a global operation of a lane.

Figure 6:
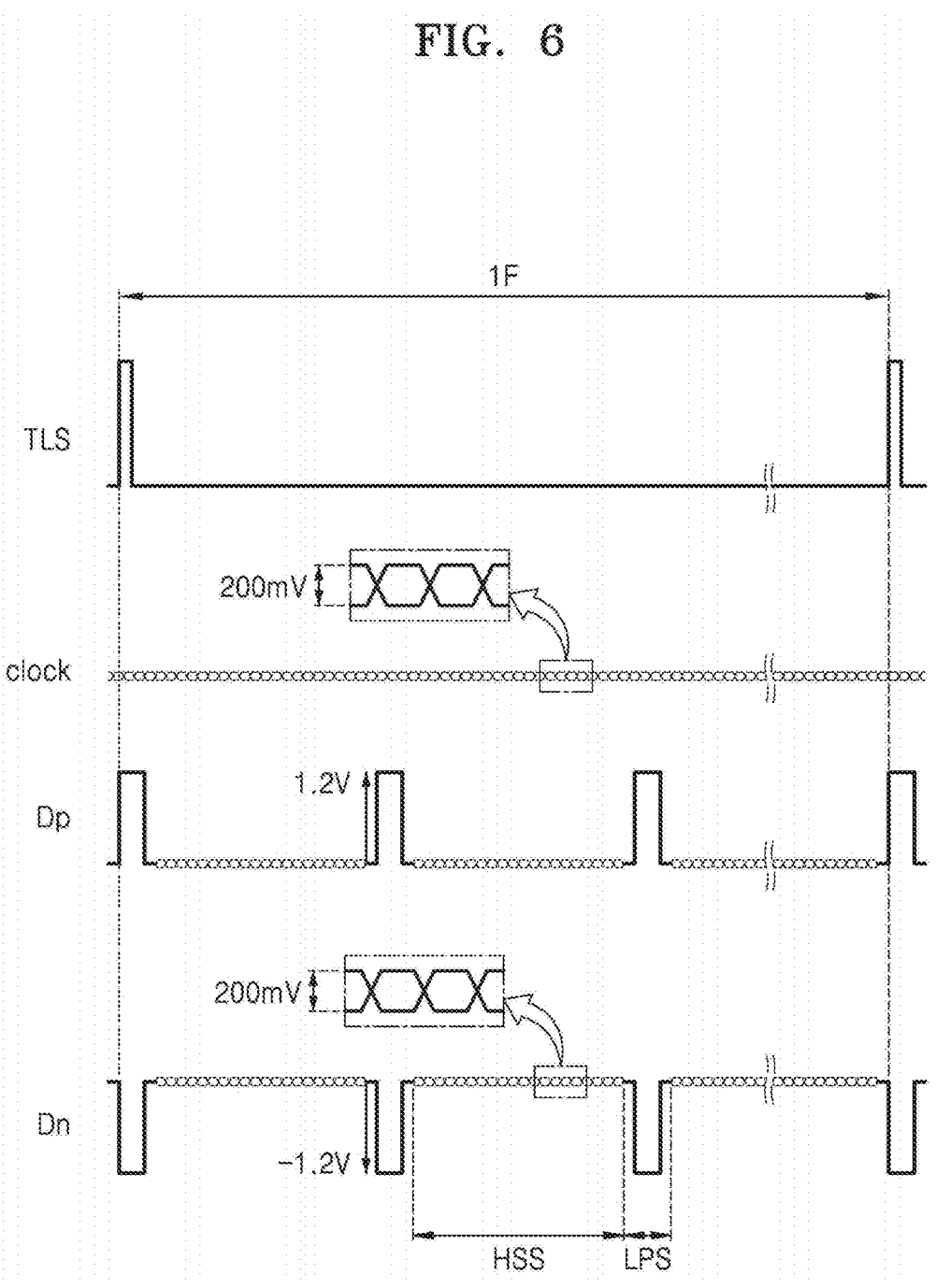
FIG. 6 illustrates waveform diagrams of a touch driving signal applied to a touch screen layer included in the display apparatus of FIG. 1, a clock signal applied to a MIPI clock lane, and signals applied to a MIPI data lane.

FIG. 6 illustrates waveform diagrams of a touch driving signal TLS applied to the touch screen layer 400 included in the display apparatus 1 of FIG. 1, a clock signal clock applied to a MIPI clock lane, and signals Dp and Dn applied to a MIPI data lane during one frame 1F.

As described above, the touch driver TIC may apply the driving signal to the driving electrodes TEa through the driving signal lines TL to drive a touch screen layer. The touch driving signal TLS of FIG. 6 indicates a driving signal applied by the touch driver TIC to the driving electrodes TEa through the driving signal lines TL. As shown in FIG. 6, the touch driving signal TLS may have a pulse waveform repeating periodically.

The clock signal clock is a signal transmitted from the transmitting interface TI to the receiving interface RI through the clock lane. In FIG. 4, the clock signal clock has been indicated as the clock signals Cp and Cn.

As described above, each of the MIPI lanes MIPIL includes two access lines and may communicate through the two access lines. The signal Dp may be transmitted through a first access line that is one of the two access lines and the signal Dn may be transmitted through a second access line that is the other one of the two access lines. The signals Dp and Dn applied to the MIPI data lane include a low power state (LPS) signal and a high speed state (HSS) signal. The LPS signal may have a pulse waveform repeating periodically. As described above, the LPS signal may have a high voltage swing in which a size of an absolute value is 1.2 V, and may be a signal distinguishing between the beginning and the end of an MIPI packet structure. The HSS signal is transmitted between the LPS signals, and as described above, has a low voltage swing of 200 mV and is a signal for image data.

In a case of the display apparatus 1 according to some embodiments, in at least one of the MIPI data lanes, a phase of the signal Dn at the second access line and a phase of the signal Dp at the first access line may be different from each other as shown in FIG. 6, when transmitting the LPS signal. For example, in at least one of the MIPI data lanes, the phase of the signal Dn at the second access line may be opposite to the phase of the signal Dp at the first access line as shown in FIG. 6, when transmitting the LPS signal. In other words, the signal Dn at the second access line may be an inverted signal of the signal Dp at the first access line. Accordingly, in FIG. 6, a size of the signal Dp at the first access line is 1.2 V, and a size of the signal Dn at the second access line is -1.2 V. When transmitting the HSS signal, the signal Dp at the first access line and the signal Dn at the second access line may both be positive voltages.

In a case of such a display apparatus 1 according to some embodiments, the at least one of the MIPI data lanes may not have or may have minimized or reduced electromagnetic influence on surrounding wires or electronic devices, when transmitting the LPS signal. This is because the signal Dn at the second access line is an inverted signal of the signal Dp at the first access line, electromagnetic waves of the first access line affecting the surrounding wires or electronic devices are roughly canceled out, i.e., destructively interfered, by electromagnetic waves of the second access line affecting the surrounding wires or electronic devices.

Figure 7:
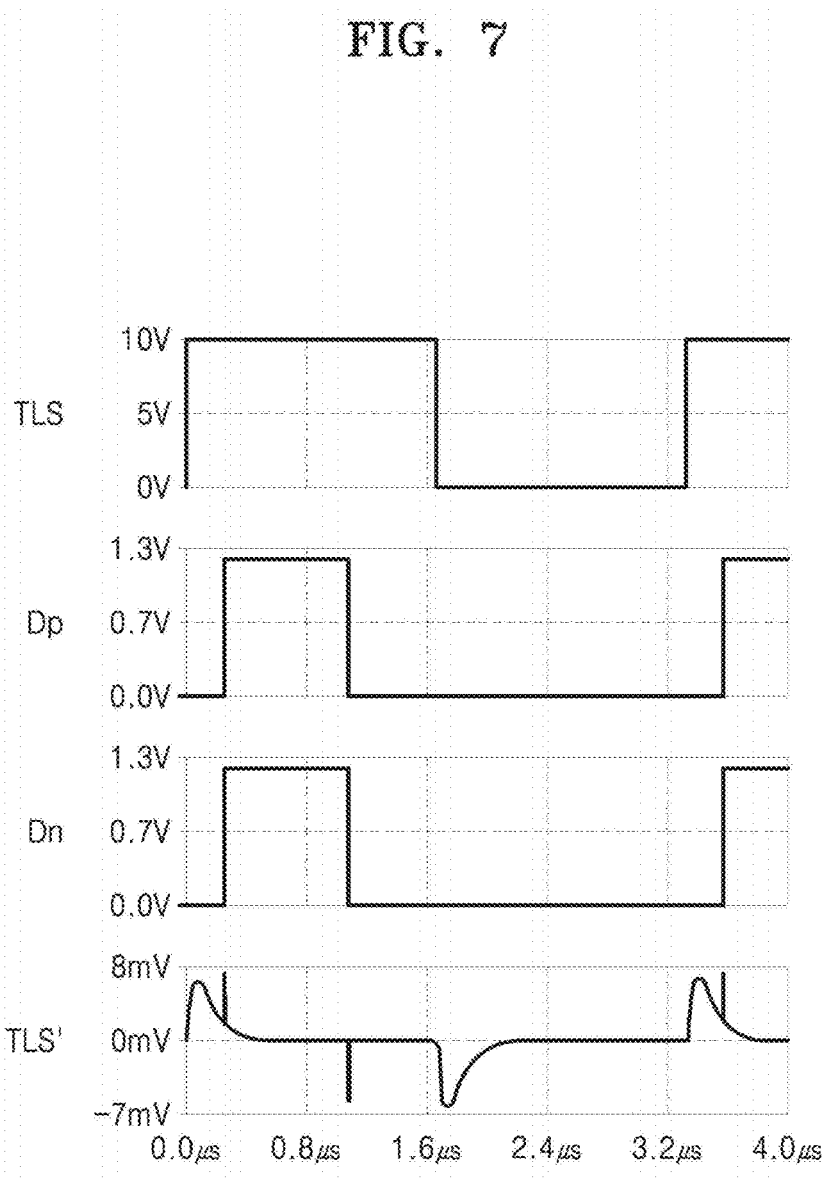
FIG. 7 illustrates waveform diagrams showing that noise is generated in a touch driving signal applied to a touch screen layer of a display apparatus, according to a comparative example.

FIG. 7 illustrates waveform diagrams showing that noise is generated in the touch driving signal TLS applied to a touch screen layer of a display apparatus, according to a comparative example. In the display apparatus according to the comparative example as well, the touch driver TIC may apply the driving signal to the driving electrodes TEa through the driving signal lines TL to drive the touch screen layer. The touch driving signal TLS of FIG. 7 indicates a driving signal applied by the touch driver TIC to the driving electrodes TEa through the driving signal lines TL. As shown in FIG. 7, the touch driving signal TLS may have a pulse waveform repeating periodically.

In a case of the display apparatus of FIG. 7 according to the comparative example, the signal Dp at the first access line and the signal Dn at the second access line have a same phase and a same size of 1.2 V, when the MIPI data lane transmits the LPS signal. As described above with reference to FIGS. 1 and 3, the driving signal lines TL electrically connecting the touch driver TIC and the driving electrodes TEa to each other, and the sensing signal lines RL electrically connecting the touch driver TIC and the sensing electrodes REa to each other, may be arranged on a layer different from a layer on which the MIPI lanes MIPIL are located and may intersect the MIPI lanes MIPIL. Thus, in a case of the display apparatus according to the comparative example, the driving signal lines TL are affected by the signal Dp at the first access line and the signal Dn at the second access line of the MIPI lane MIPIL in an intersection area (see the portion ISA of FIGS. 1 and 3).

In this regard, FIG. 7 illustrates an actual touch driving signal TLS' actually transmitted to the driving electrode TEa. As shown in FIG. 7, even when the touch driver TIC applies the driving signal to the driving electrodes TEa through the driving signal lines TL to drive the touch screen layer, the actual touch driving signal TLS' actually transmitted to the driving electrode TEa includes noise corresponding to a time when the signal Dp at the first access line and the signal Dn at the second access line increase, for example, from 0 volts (V) to 1.2 V and a time when the same decrease from 1.2 V to 0 V. Accordingly, the sensing signal transmitted to the touch driver TIC through the sensing signal lines RL connected to the sensing electrodes REa includes such noise, and as a result, an error may occur in the touch driver TIC, for example, the touch driver TIC may malfunction as if a touch has occurred despite that there is actually no touch.

However, in a case of the display apparatus 1 according to some embodiments, in at least one of the MIPI data lanes, the signal Dn at the second access line may be an inverted signal of the signal Dp at the first access line as described above. Accordingly, when the MIPI data lane transmits the LPS signal, the MIPI data lane may not have or may have minimized or reduced electromagnetic influence on the surrounding wires or electronic devices.

Figure 8:
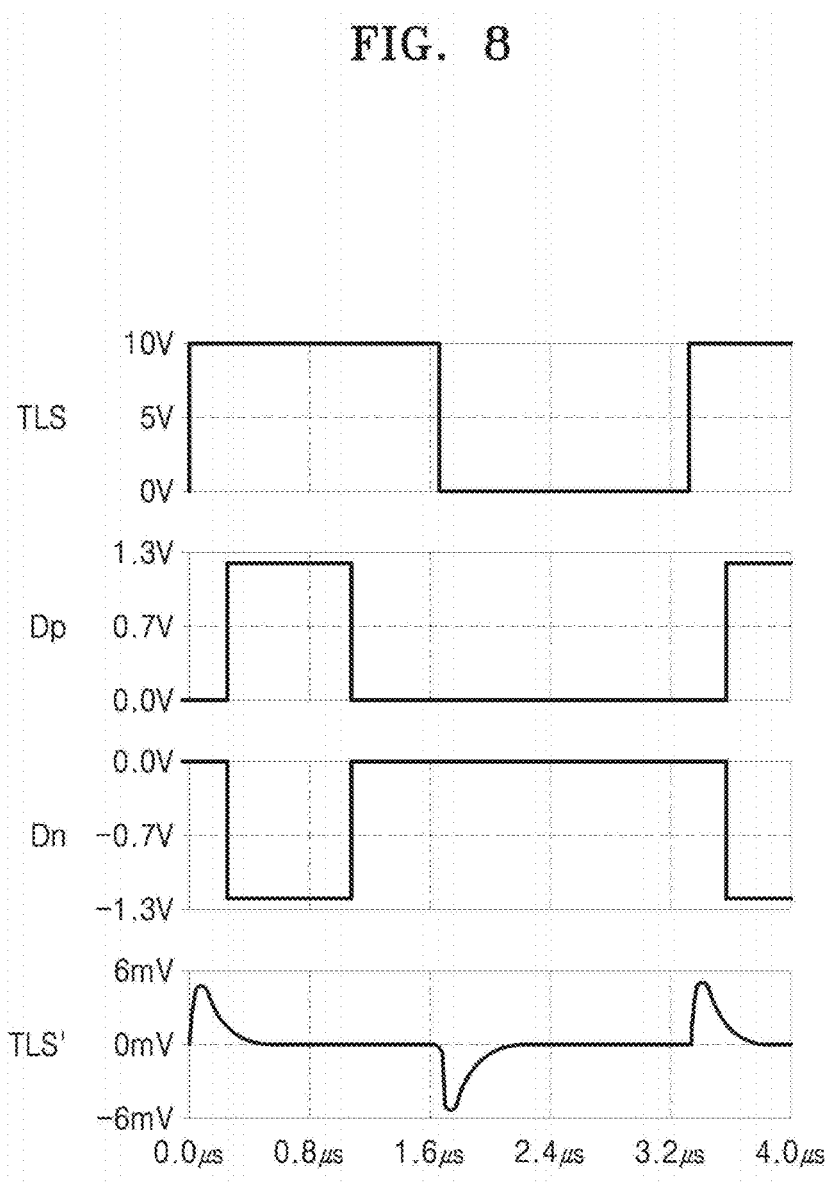
FIG. 8 illustrates waveform diagrams showing that noise is not generated in a touch driving signal applied to a touch screen layer of the display apparatus of FIG. 1.

FIG. 8 illustrates waveform diagrams showing that noise is not generated in the touch driving signal TLS applied to the touch screen layer 400 of the display apparatus 1 of FIG. 1. The touch driving signal TLS of FIG. 8 indicates a driving signal applied by the touch driver TIC to the driving electrodes TEa through the driving signal lines TL. In addition, as shown in FIG. 8, when the MIPI data lane transmits the LPS signal, the signal Dp at the first access line has a size of 1.2 V, but the signal Dn at the second access line has a size of −1.2 V. Thus, as shown in FIG. 8, it is verified that the actual touch driving signal TLS' actually transmitted to the driving electrode TEa does not include noise corresponding to a time when the signal Dp at the first access line and the signal Dn at the second access line change. This is because the signal Dn at the second access line is an inverted signal of the signal Dp at the first access line, the electromagnetic waves of the first access line affecting the surrounding wires or electronic devices are roughly canceled out, i.e., destructively interfered, by the electromagnetic waves of the second access line affecting the surrounding wires or electronic devices.

According to some embodiments, a size of noise included in the actual touch driving signal TLS' actually transmitted to the driving electrode TEa may be relatively reduced by configuring the phase of the signal Dn at the second access line to be different from or opposite to the phase of the signal Dp at the first access line. Accordingly, error occurrence during a touch sensing process may be relatively reduced.

For reference, when the MIPI data lane transmits the HSS signal, significant noise may not occur in the touch driving signal TLS. This is because the HSS signal has a low voltage swing of 200 mV as described above.

Meanwhile, the above descriptions may be applied to each of the MIPI data lanes rather than one of the MIPI data lanes. For example, in each of the MIPI data lanes, the phase of the signal Dn at the second access line may be different from the phase of the signal Dp at the first access line when transmitting the LPS signal. In addition, in each of the MIPI data lanes, the phase of the signal Dn at the second access line may be opposite to the phase of the signal Dp at the first access line when transmitting the LPS signal. According to some embodiments, in each of the MIPI data lanes, the signal Dn at the second access line may be an inverted signal of the signal Dp at the first access line when transmitting the LPS signal, thereby relatively reducing or preventing or reducing error occurrence during the touch sensing process.

Figure 9:
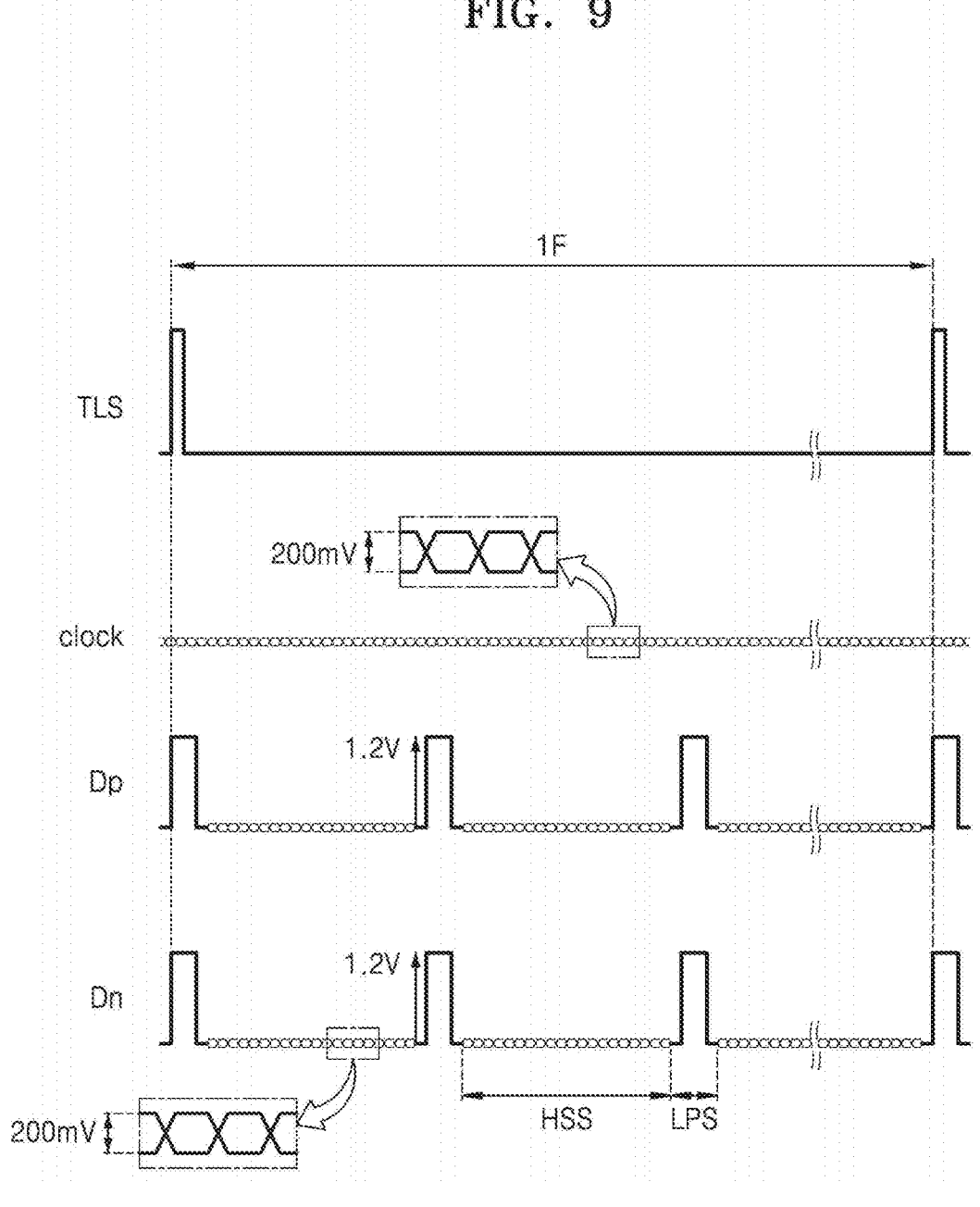
FIGS. 9 and 10 illustrate waveform diagrams of a touch driving signal applied to a touch screen layer included in a display apparatus according to some embodiments, a clock signal applied to a MIPI clock lane, and a signal applied to a MIPI data lane.
Figure 10:
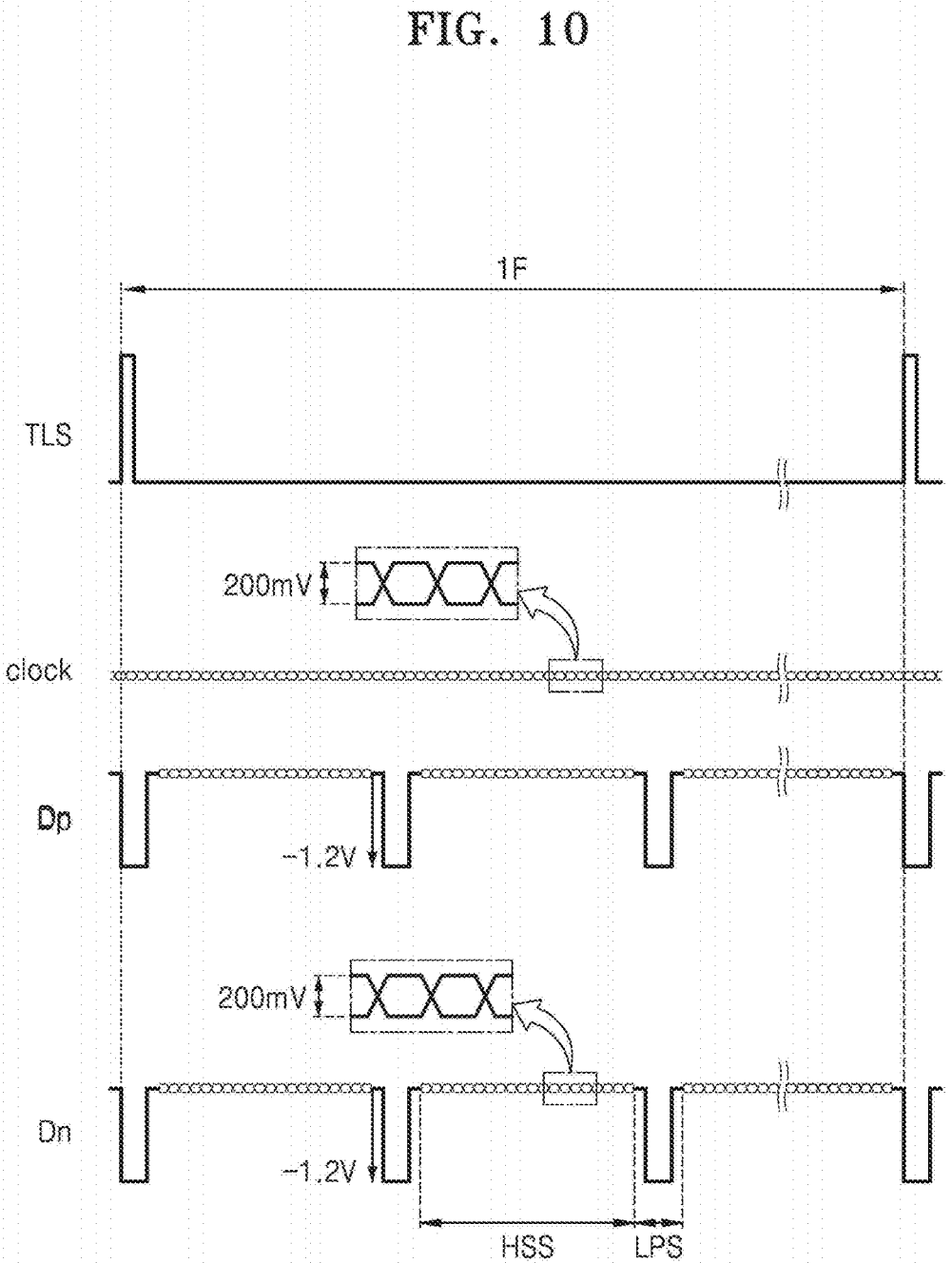

FIGS. 9 and 10 illustrate waveform diagrams of the touch driving signal TLS applied to the touch screen layer 400 included in the display apparatus 1 according to some embodiments, the clock signal clock applied to the MIPI clock lane, and the signals Dp and Dn applied to the MIPI data lane.

In a case of the display apparatus 1 according to some embodiments as described above with reference to FIG. 6 and the like, error occurrence during the touch sensing process is minimized or reduced by configuring the phase of the signal Dn at the second access line and the phase of the signal Dp at the first access line, included in one MIPI data lane, to be different from each other when transmitting the LPS signal. However, in a case of the display apparatus 1 according to some embodiments, a phase of a signal at one lane and a phase of a signal at another lane are configured to be different from each other when transmitting the LPS signal, for two adjacent lanes of the MIPI data lanes.

In FIG. 9, when transmitting the LPS signal, the signal Dp at the first access line and the signal Dn at the second access line both have a size of 1.2 V, in one lane of the two adjacent MIPI data lanes. In other words, the signal Dp at the first access line and the signal Dn at the second access line may be the same, i.e., 1.2 V. In FIG. 10, the signal Dp at the first access line and the signal Dn at the second access line both have a size of −1.2 V, in the other lane of the two adjacent MIPI data lanes. In other words, the signal Dp at the first access line and the signal Dn at the second access line may be the same, i.e., −1.2 V.

As such, in the two adjacent MIPI data lanes, a signal at one lane may be an inverted signal of a signal at the other lane when transmitting the LPS signal, and thus, the two adjacent MIPI data lanes may not have or may have minimized or reduced electromagnetic influence on the surrounding wires or electronic devices. This is because electromagnetic waves of one lane affecting the surrounding wires or electronic devices are roughly canceled out, i.e., destructively interfered by electromagnetic waves of the other lane affecting the surrounding wires or electronic devices. Accordingly, error occurrence during the touch sensing process may be relatively reduced.

According to some embodiments, a size of noise included in an actual touch driving signal actually transmitted to the driving electrode TEa may be relatively reduced by configuring the phase of the signal at one lane to be different from or opposite to the phase of the signal at the other lane in the two adjacent MIPI data lanes, when transmitting the LPS signal. Accordingly, error occurrence during the touch sensing process may be relatively reduced.

Meanwhile, as shown in FIG. 4, the number of MIPI data lane may be an even number. In this case, when transmitting the LPS signal, a phase of a signal at odd-numbered MIPI data lanes and a phase of a signal at even-numbered MIPI data lanes may be different from each other. In addition, the phase of the signal at the odd-numbered MIPI data lanes may be opposite to the phase of the signal at the even-numbered MIPI data lanes. In particular, the signal at the odd-numbered MIPI data lanes may be an inverted signal of the signal at the even-numbered MIPI data lanes, thereby minimizing, reducing, or preventing an error occurred by the MIPI data lanes during the touch sensing process.

Figure 11:
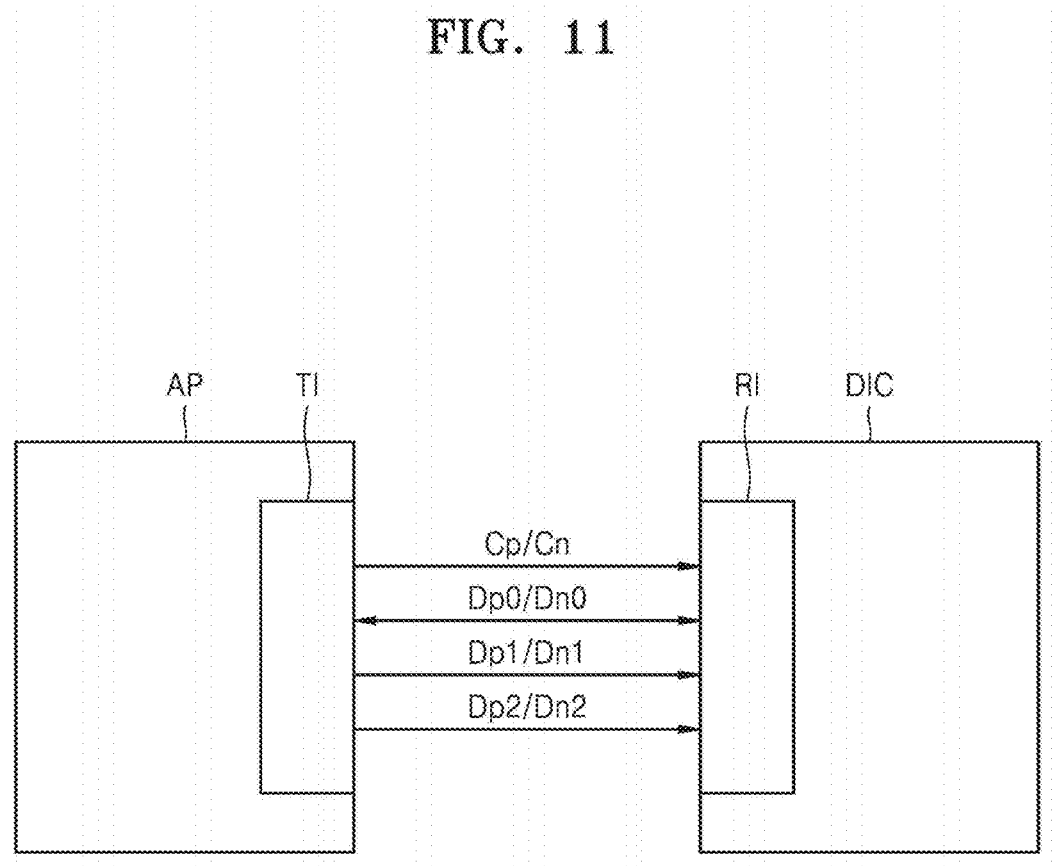
FIG. 11 is a conceptual diagram to describe a communication method between a driving driver and a processor included in a display apparatus according to some embodiments.

FIG. 11 is a conceptual diagram to describe a communication method between the driving driver DIC and the processor AP included in the display apparatus 1 according to some embodiments. As shown in FIG. 11, the number of MIPI data lane may be three.

In a pair of two adjacent lanes among such MIPI data lanes, the descriptions described above with reference to FIGS. 9 and 10 may be applied when transmitting the LPS signal. In other words, when transmitting the LPS signal, a phase of a signal at one lane of the pair may be different from a phase of a signal at the other lane of the pair. For example, when transmitting the LPS signal, the signal at one lane of the pair may be an inverted signal of the signal at the other lane of the pair. Such two pairs of lanes may be, for example, a lane transmitting the signals Dp1 and Dn1 and a lane transmitting the signals Dp2 and Dn2.

Also, for a remaining unpaired lane among the MIPI data lanes, for example, for a lane transmitting the signals Dp0 and Dn0, the descriptions described above with reference to FIG. 6 may be applied. In other words, for the remaining lane, when transmitting the LPS signal, the phase of the signal at the first access line and the phase of the signal at the second access line may be different from each other. For example, when transmitting the LPS signal, the signal at the first access line may be an inverted signal of the signal at the second access line, in the remaining lane.

Accordingly, the MIPI data lanes may not have or may have minimized or reduced electromagnetic influence on the surrounding wires or electronic devices. In other words, error occurrence during the touch sensing process may be relatively reduced.

A similar method may be applied when the number of MIPI data lanes is five. For example, the descriptions described with reference to FIGS. 9 and 10 may be applied to a pair of a first lane and a second lane, which are adjacent to each other, and a pair of a fourth lane and a fifth lane, which are adjacent to each other, and the descriptions described with reference to FIG. 6 may be applied to a third lane that is a remaining lane. Alternatively, the descriptions described with reference to FIGS. 9 and 10 may be applied to a pair of a first lane and a second lane, which are adjacent to each other, and a pair of a third lane and a fourth lane, which are adjacent to each other, and the descriptions described with reference to FIG. 6 may be applied to a fifth lane that is a remaining lane.

Meanwhile, the above descriptions may be applied to D-Phy among layers of MIPI, and to C-Phy.

According some embodiments as described above, a display apparatus in which error occurrence in a touch screen layer is relatively reduced may be implemented. The scope of embodiments according to the present disclosure are not limited by such effects.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims, and their equivalents.

What is claimed is:

1. A display apparatus comprising:
a display panel including a display layer and a touch screen layer;
a flexible printed circuit board electrically connected to one side of the display panel;
a driving driver on the display panel;
a processor on the flexible printed circuit board;
mobile industry processor interface (MIPI) data lanes on the flexible printed circuit board and electrically connecting the processor and the driving driver to each other,
wherein each of the MIPI data lanes includes a first access line and a second access line, and in at least one of the MIPI data lanes, a phase of a signal at the first access line and a phase of a signal at the second access line are configured to be different from each other, based on transmission of a low power state (LPS) signal; and
a touch driver on the flexible printed circuit board; and
touch signal lines on the flexible printed circuit board such that the touch signal lines are on a layer different from a layer on which the MIPI data lanes are located, intersect the MIPI data lanes, and electrically connect the touch driver and the touch screen layer to each other.

2. The display apparatus of claim 1, wherein, based on the at least one of the MIPI data lanes transmitting the LPS signal, the phase of the signal at the second access line is opposite to the phase of the signal at the first access line.

3. The display apparatus of claim 1, wherein, based on the at least one of the MIPI data lanes transmitting the LPS signal, the signal at the second access line is an inverted signal of the signal at the first access line.

4. The display apparatus of claim 1, further comprising a touch communication line on the flexible printed circuit board and electrically connecting the processor and the touch driver to each other.

5. The display apparatus of claim 1, wherein, in each of the MIPI data lanes, the phase of the signal at the first access line and the phase of the signal at the second access line are configured to be different from each other, based on transmission of the LPS signal.

6. The display apparatus of claim 1, wherein, in each of the MIPI data lanes, the phase of the signal at the first access line is configured to be opposite to the phase of the signal at the second access line, based on transmission of the LPS signal.

7. The display apparatus of claim 1, wherein, in each of the MIPI data lanes, the signal at the first access line is configured to be an inverted signal of the signal at the second access line, based on transmission of the LPS signal.

8. An electronic apparatus including the display apparatus of claim 1.

9. The electronic apparatus of claim 8, wherein the electronic apparatus is at least one of a smartphone, a mobile phone, a navigation device, a television (TV), a dashboard of a vehicle, a center information display (CID) apparatus of a vehicle, a room mirror display of a vehicle, a backseat entertainment device of a vehicle, an electronic notebook, an electronic book, an ultra mobile PC, a laptop computer, a tablet computer, a portable media player (PMP), a smart watch, a watch phone, a glasses type display, or a head-mounted display (HDM).

10. A display apparatus comprising:
a display panel including a display layer and a touch screen layer;
a flexible printed circuit board electrically connected to one side of the display panel;
a driving driver on the display panel;
a processor on the flexible printed circuit board; and
mobile industry processor interface (MIPI) data lanes on the flexible printed circuit board and electrically connecting the processor and the driving driver to each other,
wherein, in two adjacent lanes of the MIPI data lanes, a phase of a signal at one lane and a phase of a signal at the other lane are different from each other, based on transmission of a low power state (LPS) signal.

11. The display apparatus of claim 10, wherein the phase of the signal at the one lane is opposite to the phase of the signal at the other lane when transmitting the LPS signal.

12. The display apparatus of claim 10, wherein the signal at the one lane is an inverted signal of the signal at the other lane based on transmission of the LPS signal.

13. The display apparatus of claim 10, further comprising:
a touch driver on the flexible printed circuit board; and
touch signal lines on the flexible printed circuit board such that the touch signal lines are on a layer different from a layer on which the MIPI data lanes are located, intersect the MIPI data lanes, and electrically connect the touch driver and the touch screen layer to each other.

14. The display apparatus of claim 13, further comprising a touch communication line on the flexible printed circuit board and electrically connecting the processor and the touch driver to each other.

15. The display apparatus of claim 10, wherein a number of the MIPI data lanes is an even number, and a phase of a signal at odd-numbered MIPI data lanes is configured to be different from a phase of a signal at even-numbered MIPI data lanes based on transmission the LPS signal.

16. The display apparatus of claim 10, wherein a number of the MIPI data lanes is an even number, and a phase of a signal at odd-numbered MIPI data lanes is configured to be opposite to a phase of a signal at even-numbered MIPI data lanes based on transmission of the LPS signal.

17. The display apparatus of claim 10, wherein a number of the MIPI data lanes is an even number, and a signal at odd-numbered MIPI data lanes is configured to be an inverted signal of a signal at even-numbered MIPI data lanes based on transmission of the LPS signal.

18. The display apparatus of claim 10, wherein each of the MIPI data lanes includes a first access line and a second access line, and in each of the MIPI data lanes, a phase of a signal at the first access line and a phase of a signal at the second access line are configured to be equal.

19. An electronic apparatus including the display apparatus of claim 10.

20. The electronic apparatus of claim 19, wherein the electronic apparatus is at least one of a smartphone, a mobile phone, a navigation device, a television (TV), a dashboard of a vehicle, a center information display (CID) apparatus of a vehicle, a room mirror display of a vehicle, a backseat entertainment device of a vehicle, an electronic notebook, an electronic book, an ultra mobile PC, a laptop computer, a tablet computer, a portable media player (PMP), a smart watch, a watch phone, a glasses type display, or a head-mounted display (HDM).

21. A display apparatus comprising:

a display panel including a display layer and a touch screen layer;

a flexible printed circuit board electrically connected to one side of the display panel;

a driving driver on the display panel;

a processor on the flexible printed circuit board; and mobile industry processor interface (MIPI) data lanes on the flexible printed circuit board and electrically connecting the processor and the driving driver to each other, wherein each of the MIPI data lanes includes a first access line and a second access line, and a number of the MIPI data lanes is an odd number of three or greater, in a pair of two adjacent lanes of the MIPI data lanes, a phase of a signal at one lane of the pair and a phase of a signal at the other lane of the pair are configured to be different from each other, based on transmission of a low power state (LPS) signal, and in remaining unpaired lanes of the MIPI data lanes, a phase of a signal at the first access line and a phase of a signal at the second access line are configured to be different from each other, based on transmission of the LPS signal.

22. The display apparatus of claim 21, wherein the signal at the one lane of the pair is an inverted signal of the signal at the other lane of the pair.

23. The display apparatus of claim 21, wherein a signal at the first access line of the remaining unpaired lanes is an inverted signal of a signal at the second access line of the remaining unpaired lanes.

24. An electronic apparatus including the display apparatus of claim 21.

25. The electronic apparatus of claim 24, wherein the electronic apparatus is at least one of a smartphone, a mobile phone, a navigation device, a television (TV), a dashboard of a vehicle, a center information display (CID) apparatus of a vehicle, a room mirror display of a vehicle, a backseat entertainment device of a vehicle, an electronic notebook, an electronic book, an ultra mobile PC, a laptop computer, a tablet computer, a portable media player (PMP), a smart watch, a watch phone, a glasses type display, or a head-mounted display (HDM).

* * * * *